United States Patent [19]

Wilder, Jr.

[11] 4,202,700

[45] May 13, 1980

[54] GLASSY COMPOSITION FOR HERMETIC SEALS

[75] Inventor: James A. Wilder, Jr., Albuquerque, N. Mex.

[73] Assignee: The United States of America as represented by the United States Department of Energy, Washington, D.C.

[21] Appl. No.: 35,157

[22] Filed: May 2, 1979

[51] Int. Cl.² .......................... C03C 3/22; C03C 3/16; C03C 3/04
[52] U.S. Cl. ................................ 106/39.6; 106/39.8; 106/52; 106/53; 106/54; 106/47 R
[58] Field of Search ...................... 106/39.6, 39.8, 52, 106/53, 54, 47 R

[56] References Cited

U.S. PATENT DOCUMENTS

| | | | |
|---|---|---|---|
| 2,920,972 | 1/1960 | Godron | 106/47 R |
| 3,215,543 | 11/1965 | Bre | 106/47 R |
| 3,248,234 | 4/1966 | Godron | 106/47 R |
| 3,253,934 | 5/1966 | Godron | 106/47 R |
| 3,407,091 | 10/1968 | Busdiecker | 106/47 R |
| 3,519,445 | 7/1970 | MacDowell et al. | 106/47 R |
| 3,640,827 | 2/1972 | Lutz | 106/47 R |
| 3,989,532 | 11/1976 | Ray et al. | 106/47 R |
| 4,022,707 | 5/1977 | Deutschbein et al. | 106/47 R |
| 4,026,714 | 5/1977 | Lewis | 106/47 R |
| 4,110,245 | 8/1978 | Yamashita | 106/47 R |

FOREIGN PATENT DOCUMENTS 1174475  12/1969  United Kingdom .................... 106/39.6

*Primary Examiner*—O. R. Vertiz
*Assistant Examiner*—Mark Bell
*Attorney, Agent, or Firm*—R. V. Lupo; Dudley W. King; Robert Southworth, III

[57] ABSTRACT

The invention relates to a glassy composition adaptable for sealing to aluminum-based alloys to form a hermetically-sealed insulator body. The composition may either be employed as a glass or, after devitrifying heat treatment, as a glass-ceramic.

3 Claims, No Drawings

GLASSY COMPOSITION FOR HERMETIC SEALS

BACKGROUND OF THE INVENTION

The invention relates to a glass or glass-ceramic composition especially suitable for sealing to aluminum-based alloys.

In applications requiring the passing of electrical leads through an insulator wall such as in a vaccum tube or an explosive detonator, there is a need for an insulator which readily forms complex mechanical seals, has low gas permeability, has high chemical durability, has high mechanical strength, has high electrical resistivity, and has a thermal expansivity close to that of the metal to be sealed.

In the past, glass-ceramic compositions have been devised for sealing to molybdenum (U.S. Pat. No. 3,957,496) and to stainless steel (U.S. Pat. No. 4,135,936). These compositions require temperatures in excess of 900° C. to form the seal and to devitrify the glass. Designers have generally avoided using aluminum in glass-to-metal seals because of the lack of glass composition with the desired thermal coefficient of expansion ($235 \times 10^{-7}$° C.$^{-1}$) which would form a seal to aluminum below its melting point (660° C.).

SUMMARY OF THE INVENTION

In view of the above limitations and drawbacks, it is an object of this invention to provide a glassy composition that may be sealed to aluminum.

It is a further object of this invention to provide a glass or glass-ceramic composition that forms high strength hermetic seals with aluminum having low gas permeability and high chemical durability.

It is a still further object of this invention to provide an improved glassy composition for an insulator body to be sealed to metal that reduces or minimizes the above-cited limitations.

The invention comprises a glassy composition useful for sealing to a metal, the composition including from 10 to to 60 mole percent $Li_2O$, $Na_2O$, or $K_2O$; from 5 to 40 mole percent BaO or CaO; from 0.1 to 10 mole percent $Al_2O_3$; and from 40 to 70 mole percent $P_2O_5$. The composition may also contain up to 30 mole percent of various nucleating agents, wetting agents, and other modifiers.

Other objects and advantages of the present invention will be apparent to those skilled in the art from the following description with reference to the appended claims.

DETAILED DESCRIPTION

The glassy compositions of this invention have the following constituents: $LiO_2$, $Na_2O$, or $K_2O$; BaO or CaO; $Al_2O_3$; and $P_2O_5$. Other constituents may be present such as nucleating agents, wetting agents or other modifiers.

The glassy composition contains from 10 to 60 mole percent $Li_2O$, $Na_2O$, or $K_2O$ with from 35 to 40 mole percent of $Na_2O$ and up to 5 mole percent $K_2O$ being preferable. The composition also contains from 5 to 40 mole percent BaO or CaO with 10 to 15 mole percent BaO being preferable. The composition further contains from 0.1 to 10 mole percent $Al_2O_3$ with from 0.5 to 3 mole percent being preferable. In addition, the composition still further contains from 40 to 70 mole percent $P_2O_5$ with 45 to 55 mole percent being preferable.

The glassy composition may either be employed as a glass, or, where greater strength or thermal shock resistance is desired as a glass-ceramic. In order to cause the devitrification needed to produce a glass-ceramic, there may be employed up to 0.1 mole percent of a nucleating agent such as platinum or up to 10 mole percent of nucleating agents such as $TiO_2$, $ZrO_2$, $Y_2O_3$, $La_2O_3$, or $Ta_2O_5$, with up to 5 mole being preferable.

A satisfactory heat treatment schedule which will cause the glass for form a seal and subsequently devitrify into a glass-ceramic is to heat the glass in contact with the metal to 350° to 400° C. for about 2 hours to form the desired seal with the metal, thereafter increasing the temperature to 400° to 450° C. for about 2 hours for nucleation of the crystal phase, subsequently increasing the temperature to 450° to 525° C. for about 2 hours for growth of the crystal phase, and then cooling to room temperature. A satisfactory heating rate is 5° C. per minute and a satisfactory cooling rate is 1° C. per minute.

It has been found that the use of up to 10 mole percent but preferably up to 5 mole percent of a wetting agent such as CoO, CuO, SnO, $Ag_2O$, $Cr_2O_3$ or NiO will help the glass wet and therefore seal to the aluminum.

In addition, up to 30 mole percent but preferably up to 10 mole percent of other materials such as PbO, $WO_3$, $B_2O_3$, $SiO_2$, $GeO_2$, or $ZnO_2$ may be added to modify the mechanical properties of the composition.

A specific example of the glassy composition contains 40 mole percent $Na_2O$, 10 mole percent BaO, 1 mole percent $Al_2O_3$ and 49 mole percent $P_2O_5$. Up to 0.1 mole percent Pt may be added as a nucleating agent and up to 5 mole percent CoO may be added as a wetting agent. This particular formulation has a thermal expansion coefficient of $203 \times 10^{-7}$° C.$^{-1}$ as a glass and $225 \times 10^{-7}$° C.$^{-1}$ as a glass-ceramic. The formulation has a glass transition temperature of 303° C. with viscosity of $10^{14}$ poise at 300° C. falling to $10^8$ poise at 400° C. It exhibited a fracture toughness of 0.423 KSI-in$^2$, a Young's modulus of $5.8 \times 10^6$ psi, and a shear modulus of $2.25 \times 10^6$ psi. Electrical resistivity was measured as $10^{11}$ ohm-cm at room temperature and $10^6$ ohm-cm at 200° C. Chemical durability as measured by the leach rate in deionized water was found to be $10^{-6}$ g cm$^{-2}$ min$^{-1}$. The noted presence of $Al_2O_3$ was found to profoundly affect the chemical durability. The formulation also possesses low helium permeability, being about $10^9$ atoms-sec$^{-1}$ cm$^{-1}$ atm$^{-1}$.

It has been found that through appropriately modifying the proportions of the constituents, glassy compositions are obtained having thermal coefficients expansion from 160 to $260 \times 10^{-7}$° C.$^{-1}$. For sealing to aluminum, a composition with a thermal coefficient of expansion of $235 \times 10^{-7}$° C.$^{-1}$ would be used.

The glasses of this invention may be prepared mixing powders in the appropriate proportions of the metal oxides or carbonates plus ammonium dihydrogen phosphate. The mixed powders are first calcined at 300° C. to drive off water and ammonia and then fused at from 850° to 1000° C. If platinum is to be used as a nucleating agent, it may be added to the melt as a solution of chloroplatinic acid. The glass may then be used or cast into bulk slabs or preforms for later use in manufacturing the desired seals.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A glassy composition having high chemical durability and low gas permeability for hermetically sealing to aluminum and its alloys comprising: about 40 mole percent $Na_2O$, 10 mole percent BaO, 1 mole percent $Al_2O_3$, and 49 mole percent $P_2O_5$, and wherein said glassy composition has a thermal coefficient of expansion of about $235 \times 10^{-7}$ $°C.^{-1}$.

2. The invention of claim 1 wherein the glassy composition further comprises up to 0.1 mole percent platinum; up to 10 mole percent $TiO_2$, $ZrO_2$, $Y_2O_2$, $La_2O_3$, or $Ta_2O_5$; up to 5 mole percent CoO, CuO, SnO, $Ag_2O$, $Cr_2O_3$, or NiO; and up to 10 mole percent PbO, $WO_3$, $B_2O_3$, $SiO_2$, $GeO_2$, or $ZnO_2$.

3. A glass-ceramic composition having high chemical durability and low glass permeability for hermetically sealing to aluminum and its alloys comprising: about 40 mole percent $Na_2O$, 10 mole percent BaO, 1 mole percent $Al_2O_3$, and 49 mole percent $P_2O_5$, and wherein said glassy composition has a thermal coefficient of expansion of about $235 \times 10^{-7}$ $°C.^{-1}$.

* * * * *